(12) United States Patent
Tanida et al.

(10) Patent No.: US 8,651,382 B2
(45) Date of Patent: Feb. 18, 2014

(54) TWO-DIMENSIONAL CODE READING DEVICE, TWO-DIMENSIONAL CODE READING METHOD, METHOD OF CONTROLLING MANUFACTURING HISTORY INFORMATION OF MEMBER HAVING SUBSTANTIALLY CIRCULAR SECTION ORTHOGONAL TO THE CENTRAL AXIS THEREOF, AND METHOD OF MANUFACTURING THE MEMBER USING THE CONTROL METHOD

(75) Inventors: Mutsumi Tanida, Osaka (JP); Masami Sakiyama, Osaka (JP); Masayuki Yoshida, Amagasaki (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 154 days.

(21) Appl. No.: 12/996,637

(22) PCT Filed: Jun. 23, 2009

(86) PCT No.: PCT/JP2009/061368
§ 371 (c)(1),
(2), (4) Date: Oct. 3, 2011

(87) PCT Pub. No.: WO2009/157431
PCT Pub. Date: Dec. 30, 2009

(65) Prior Publication Data
US 2012/0022680 A1    Jan. 26, 2012

(30) Foreign Application Priority Data

Jun. 26, 2008  (JP) .................................. 2008-166930

(51) Int. Cl.
*G06K 7/10*   (2006.01)
*G06K 7/14*   (2006.01)
*G06K 15/12*  (2006.01)

(52) U.S. Cl.
USPC .................. 235/454; 235/462.41; 235/462.42

(58) Field of Classification Search
USPC ......................................................... 235/454
See application file for complete search history.

(56) References Cited

U.S. PATENT DOCUMENTS 4,625,101 A * 11/1986 Hinks et al. ............... 235/462.01
5,268,566 A * 12/1993 Wakaumi et al. ............. 235/493

(Continued)

FOREIGN PATENT DOCUMENTS

JP            7-29643        6/1995
JP         2001-160115       6/2001

(Continued)

*Primary Examiner* — Michael G Lee
*Assistant Examiner* — Suezu Ellis
(74) *Attorney, Agent, or Firm* — Clark & Brody

(57) ABSTRACT

A two-dimensional code reading device 20 is provided with image pickup device 22 which receives light reflected from either of a first inclined portion 12 and a second inclined portion 13 in a direction forming an angle $\theta$ satisfying expression (1) with respect to the normal-line direction R, and light source 21 which irradiates either of the inclined portions from a direction forming an angle $\alpha$ satisfying expression (2) with respect to the normal-line direction R:

$$30° \leq \theta \leq 35° \qquad (1)$$

$$\Delta\theta = \theta - 180° + \alpha + 2\beta \qquad (2)$$

where $\beta$ is less than 90°,
$\Delta\theta$ is not less than −10° but not more than 10°, and
$\theta$ and $\alpha$ are angles in a turn direction reverse to a turn direction at which either of the inclined portions forms the angle $\beta$ with respect to the normal-line direction R.

2 Claims, 6 Drawing Sheets

(56) References Cited

U.S. PATENT DOCUMENTS

| | | | | |
|---|---|---|---|---|
| 5,393,967 A | * | 2/1995 | Rice et al. | 235/454 |
| 5,406,060 A | * | 4/1995 | Gitin | 235/462.42 |
| 5,461,239 A | * | 10/1995 | Atherton | 250/566 |
| 5,602,378 A | * | 2/1997 | Vaarala | 235/462.08 |
| 5,677,522 A | * | 10/1997 | Rice et al. | 235/454 |
| 6,135,350 A | * | 10/2000 | White et al. | 235/380 |
| 6,573,523 B1 | * | 6/2003 | Long | 250/559.4 |
| 7,877,159 B2 | * | 1/2011 | Tanida | 700/115 |

FOREIGN PATENT DOCUMENTS

| | | | |
|---|---|---|---|
| JP | 2003-295936 | | 10/2003 |
| JP | 2008269219 A | * | 11/2008 |
| WO | 2008/015871 | | 2/2008 |

\* cited by examiner

TWO-DIMENSIONAL CODE READING DEVICE, TWO-DIMENSIONAL CODE READING METHOD, METHOD OF CONTROLLING MANUFACTURING HISTORY INFORMATION OF MEMBER HAVING SUBSTANTIALLY CIRCULAR SECTION ORTHOGONAL TO THE CENTRAL AXIS THEREOF, AND METHOD OF MANUFACTURING THE MEMBER USING THE CONTROL METHOD

TECHNICAL FIELD

The present invention relates to a two-dimensional code reading device which reads a two-dimensional code carved on a member having a substantially circular section orthogonal to the central axis thereof (hereinafter appropriately referred to as a "member") and a two-dimensional code reading method, as well as a method of controlling manufacturing history information about members which enables manufacturing history information for each member to be controlled properly and efficiently and a method of manufacturing the member using the control method. Examples of a member having a substantially circular section orthogonal to the central axis thereof include a tubular or bar-like member whose outer circumferential edge in the above-described section is substantially circular.

BACKGROUND ART

In the steel pipe or tube (hereinafter referred to as "pipe" when deemed appropriate) manufacturing process, in order to control the manufacturing history information about steel pipes, according to conventional practice, numbers for identifying individual steel pipes have been written by hand on the steel pipes and manufacturing history information tied to the numbers written on the steel pipes has been written down on sheets of paper. However, the numbers written on the steel pipes may sometimes disappear during the conveyance of the steel pipes in each manufacturing process and hence with the above-described method, the manufacturing history information about the steel pipes may become incapable of being properly controlled. The present applicant proposed in Patent Literature 1 that a two-dimensional code indicating an identifier for identifying pipes, such as steel pipes, be carved on a pipe by means of imprinting and the like. If a two-dimensional code is carved on a pipe by means of imprinting and the like, it is possible to prevent the two-dimensional code from disappearing during the conveyance of the pipe in each manufacturing process.

In the case where such a two-dimensional code is carved on a pipe, the two-dimensional code is read out, for example, by optical read means composed of illumination means, image pickup means and the like before the pipe is caused to undergo each manufacturing process or while the pipe is being caused to undergo each manufacturing process. Next, manufacturing history information obtained in each manufacturing process and an identifier indicated by the read-out two-dimensional code are stored by being tied to each other. By performing the above-described actions, it is possible to appropriately control the manufacturing history information about pipes in each manufacturing process.

However, optimum read conditions of a two-dimensional code which enable the two-dimensional code carved on a pipe by means of imprinting and the like to be read stably and with good accuracy (for example, optimum directions for the illumination direction and image pickup direction of a two-dimensional code) have not been found out. For this reason, in some cases it was impossible to control pipe manufacturing history information in each manufacturing process properly and efficiently by using a two-dimensional code carved on a pipe by means of imprinting and the like.

CITATION LIST

Patent Literature

[Patent Literature 1] WO2008/015871

SUMMARY OF INVENTION

Technical Problem

The object of the present invention is to provide a two-dimensional code reading device and a two-dimensional code reading method which enable a two-dimensional code carved on a member to be read stably and with good accuracy, as well as a method of controlling manufacturing history information about members which enables manufacturing history information for each member to be controlled properly and efficiently and a method of manufacturing the member using the control method.

Solution to Problem

As a method which enables a two-dimensional code carved on a member by means of imprinting and the like to be read stably and with good accuracy, the present inventors first thought out a method of picking up a dark image of concave portions forming the two-dimensional code and a bright image of the surface of the member (a portion on which no concave portion of the two-dimensional code is carved). However, the surface of the member has texture unevenness and a curvature. For this reason, it was difficult to pick up a bright image of the entire surface of the member. Therefore, the present inventors thought out a method of picking up a bright image of the concave portions forming the two-dimensional code and a dark image of the surface of the member. In general, a plurality of concave portions carved by means of imprinting and the like have inclined portions which are mutually inclined in the same direction, so long as they are carved by the same imprinting member (for example, a pin which carves concave portions by being pressed against the member, and the like). The present inventors thought that if the illumination direction in which the two-dimensional code is illuminated and the image pickup direction in which an image of the two-dimensional code is picked up are changed according to the inclination angle of the inclined portions, it may be possible to pick up a bright image of the concave portions and hence to be able to read the two-dimensional code stably and with good accuracy.

On the basis of the above-described idea, the present inventors conducted earnest investigations and thought of the case where, as shown in FIG. 1, a concave portion 11 forming a two-dimensional code has an inclined portion 13. This inclined portion 13 is a region inclined so as to form an angle $\beta$ in a prescribed turn direction (here, the counterclockwise direction for the sake of convenience of explanation) with respect to a normal-line direction R of the surface of a member, such as a steel pipe P, where no concave portion 11 is formed, in a section including the central axis Z of the member and the center of the concave portion 11. The present inventors found out that in the case where the inclined portion 13 is illuminated from the direction forming an angle $\alpha$ in a clockwise direction with respect to the normal-line direction R, if image pickup means 22 is arranged so as to receive the light L2 reflected from the inclined portion 13 in a direction forming an angle θ of less than 30° in the clockwise direction with respect to the normal-line direction R, then the light L4 reflected from the surface of the steel pipe P (particularly, the surface at the periphery of the concave portion 11) is easily received by the image pickup means 22.

The present inventors considered the reason why the light L4 reflected from the surface of the steel pipe P is easily received by the image pickup means 22 if the angle θ is less than 30° like this, as follows. First, when the angle θ is reduced, as shown in FIG. 2, the angle (α+θ) becomes small, which is formed by the reflection direction of the specularly reflected light L5, which is reflected specularly from the surface of the steel pipe P, and the light L2 received by the image pickup means 22. The light reflected from the surface of the steel pipe P has a certain amount of spread and hence the present inventors considered that part of the light reflected from the surface of the steel pipe P becomes more easily received by the image pickup means 22 when the angle (α+θ) becomes small. Therefore, increasing the angle (α+θ) by increasing the angle α is conceivable in order to ensure that the light reflected from the surface of the steel pipe P is not easily received by the image pickup means 22. However, if the angle α is increased by arranging the illumination means 21 as indicated by a dashed line of FIG. 1, then the light L1' from the illumination means 21 is cut off by the surface of the member and the light L1' does not easily enter the inner side of the concave portion 11. For this reason, in the inclined portion 13, the area of the region irradiated by the illumination means 21 becomes small. From the foregoing, the present inventors found out that the region of the concave portion 11 from which a bright image can be picked up becomes small.

The present invention was completed on the basis of the new knowledge described above.

The present invention provides a two-dimensional code reading device which reads a two-dimensional code composed of a plurality of concave portions carved in a member having a substantially circular section orthogonal to a central axis thereof, wherein the two-dimensional code reading device comprises illumination means which irradiates the two-dimensional code with light from a direction along the central axis of the member and image pickup means which picks up an image of the two-dimensional code from a direction along the central axis, wherein the concave portion has a pair of a first inclined portion and a second inclined portion of which a mutual space in the direction of the central axis becomes narrow toward a radial inner side of the member in a section including the central axis and the center of the concave portion, wherein the first inclined portion is inclined so as to form an angle β in a clockwise direction with respect to a normal-line direction of a surface of the member in the section, wherein the second inclined portion is inclined so as to form an angle β in a counterclockwise direction with respect to the normal-line direction, wherein the image pickup means is arranged so as to receive light reflected in a direction forming an angle θ satisfying expression (1) below with respect to the normal-line direction in the section in either of the first inclined portion and the second inclined portion, and wherein the illumination means is arranged so as to irradiate either of the inclined portions from a direction forming an angle α satisfying expression (2) below with respect to the normal-line direction in the section:

$$30° \leq \theta \leq 35° \quad (1)$$

$$\Delta\theta = \theta - 180° + \alpha + 2\beta \quad (2)$$

where β is less than 90°,

Δθ is not less than −10° but not more than 10°, and

θ and α are angles in a turn direction reverse to a turn direction at which either of the inclined portions forms the angle β with respect to the normal-line direction.

Because the angles α, θ, and β have values satisfying expression (2), in the present invention, the image pickup means is arranged in such a position that either of the first inclined portion and the second inclined portion is irradiated by the illumination means and the image pickup means easily receives the specularly reflected light, which is reflected specularly from either of the inclined portions. The reason why the image pickup means is arranged in a position where the image pickup means easily receives the above-described specularly reflected light will be described with the aid of FIG. 1. Although for the sake of convenience of explanation, the description is given with the aid of FIG. 1, the configuration of a two-dimensional code reading device of the present invention is not limited to the configuration shown in FIG. 1. If as shown in FIG. 1, the image pickup means 22 (a broken line of FIG. 1) is arranged in a position where the image pickup means 22 most easily receives the specularly reflected light L3, which is reflected specularly from the second inclined portion 13, among the light L1 irradiated by the illumination means 21 in the second inclined portion 13, then an angle θ1 formed by the direction in which the illumination means 21 irradiates the second inclined portion 13 and the second inclined portion 13, and an angle θ2 formed by the reflection direction of the specularly reflected light L3 and the second inclined portion 13 are the same. The angle θ1 is {(90°−α)+(90°−β)} and the angle θ2 is (β+θ). Therefore, if the image pickup means 22 is arranged in a position where the image pickup means 22 most easily receives the specularly reflected light L3, then the difference Δθ between the angle θ1 and the angle θ2 (Δθ=θ2−θ1=θ−180°+α+2β) becomes 0. In the present invention, it is required that the difference Δθ (Δθ=θ−180°+α+2β) be not less than −10° but not more than 10°, and hence the image pickup means 22 is arranged in a position where the image pickup means 22 easily receives the specularly reflected light L3. Because the image pickup means is arranged in a position where the image pickup means easily receives the above-described specularly reflected light like this, the image pickup means can pick up a very bright image of a concave portion. On the other hand, in the present invention, it is required that the angle θ be not less than 30°. For this reason, as described above, the light reflected from a surface of the member (a part where no concave portion is carved) is not easily received by the image pickup means. Therefore, the image pickup means can pick up a very dark image of the surface of the member. For this reason, the contrast between the concave portion and the surface of the member is high in the image of a steel pipe P picked by the image pickup means.

Because it is required that the angle θ be not less than 30°, it is unnecessary to increase the angle α in order to ensure that the light reflected from the surface of the member is not easily received by the image pickup means. Therefore, the phenomenon that the region for which a bright image can be picked up decreases in the concave portion, which is caused by an increase in the angle α, does not occur, and it is possible to prevent a region corresponding to the concave portion (a region of high luminance) in an image picked up by the image pickup means from becoming small.

Because in the present invention it is required that the angle θ be not more than 35°, in an image of the member picked up by the image pickup means, the distortion of the two-dimensional code is prevented from increasing. Furthermore, in the present invention, the two-dimensional code is irradiated with light from a direction along the direction of the central axis of the member and an image of the two-dimensional code is picked up from a direction along the direction of the central axis of the member. That is, in the present invention, the irradiation direction and the image pickup direction are directions along the central axis of the member. For this reason, in an image of the member picked up by the image pickup means, the occurrence of the phenomenon that the two-dimensional code becomes distorted by the curvature of the member is also suppressed.

For the reasons described above, according to the two-dimensional code reading device of the present invention, it is possible to read the two-dimensional code stably and with good accuracy. Examples of a member having a substantially circular section orthogonal to the central axis thereof include a tubular or bar-like member whose outer circumferential edge in the above-described section is substantially circular.

The present invention also provides a two-dimensional code reading method for reading a two-dimensional code composed of a plurality of concave portions carved in a member having a substantially circular section orthogonal to a central axis thereof, wherein the two-dimensional code reading method includes an illumination step of irradiating the two-dimensional code with light from a direction along the central axis of the member and an image pickup step of picking up an image of the two-dimensional code from a direction along the direction of the central axis, wherein the concave portion has a pair of a first inclined portion and a second inclined portion of which a mutual space in the direction of the central axis becomes narrow toward a radial inner side of the member in a section including the central axis and the center of the concave portion, wherein the first inclined portion is inclined so as to form an angle β in a clockwise direction with respect to a normal-line direction of a surface of the member in the section, wherein the second inclined portion is inclined so as to form an angle β in a counterclockwise direction with respect to the normal-line direction, wherein in the image pickup step, light reflected in a direction forming an angle θ satisfying expression (3) below with respect to the normal-line direction in the section is received in either of the first inclined portion and the second inclined portion, and wherein in the illumination step, either of the inclined portions is irradiated from a direction forming an angle α satisfying expression (4) below with respect to the normal-line direction in the section:

$$30° \leq \theta \leq 35° \quad (3)$$

$$\Delta\theta = \theta - 180° + \alpha + 2\beta \quad (4)$$

where β is less than 90°,

Δθ is not less than −10° but not more than 10°, and

θ and α are angles in a turn direction reverse to a turn direction at which either of the inclined portions forms the angle β with respect to the normal-line direction.

The present invention further provides a method of controlling manufacturing history information in a manufacturing process of a member which has a substantially circular section orthogonal to a central axis thereof and whose end portion is subjected to thread cutting, including:

a carving step of carving a two-dimensional code indicating an identifier for identifying the member in a region where thread cutting of the member is to be performed by use of carving means before the first manufacturing process is performed among manufacturing processes which become control objects of the manufacturing history information;

a read step of reading the two-dimensional code carved in the member by use of read means before each of the manufacturing processes is performed or while each of the manufacturing processes is being performed;

a storage step of storing manufacturing history information of the member obtained in each of the manufacturing processes and an identifier indicated by the two-dimensional code read about the member by tying the manufacturing history information and the identifier to each other; and a removal step of removing the two-dimensional code carved in the member in the process of subjecting the end portion of the member to thread cutting among manufacturing processes which become control objects of the manufacturing history information, wherein the two-dimensional code is composed of a plurality of concave portions carved in the member, wherein the concave portion has a pair of a first inclined portion and a second inclined portion of which a mutual space in the direction of the central axis becomes narrow toward a radial inner side of the member in a section including the central axis of the member and the center of the concave portion, wherein the first inclined portion is inclined so as to form an angle β in a clockwise direction with respect to a normal-line direction of a surface of the member in the section, wherein the second inclined portion is inclined so as to form an angle β in a counterclockwise direction with respect to the normal-line direction, and wherein the read means is the two-dimensional code reading device according to claim 1.

According to the method of controlling manufacturing history information of a member having a substantially circular section orthogonal to the central axis thereof in the present invention, before the first manufacturing process is performed among manufacturing processes which become control objects of the manufacturing history information, in a step of carving a two-dimensional code indicating an identifier for identifying the member and subjecting an end portion of the member to thread cutting, the two-dimensional code carved in the member is removed. Therefore, for each of the manufacturing processes which become control objects of manufacturing history information, a two-dimensional code is carved when reading is performed by the two-dimensional code reading device, and it is possible to store the obtained manufacturing history information of a member and an identifier indicated by the two-dimensional code read about the member by tying the manufacturing history information and the identifier to each other. On the other hand, because the two-dimensional code is removed in the process of subjecting an end portion of the member to thread cutting and the two-dimensional code does not remain in the member as a product, no problem occurs at all even when the member to which the present invention is applied is an oil-well steel pipe and the like, for which required specifications concerning corrosion resistance and the like have become severe.

The present invention further provides a method of manufacturing the member including a manufacturing process in which manufacturing history information about the member is controlled by the above-mentioned method.

According to the present invention, it is possible to read a two-dimensional code carved on a member stably and with good accuracy and at the same time, it is possible to control manufacturing history information for each member appropriately and efficiently.

BRIEF DESCRIPTION OF DRAWINGS

FIG. 4A shows a steel pipe on which a two-dimensional code is carved and a two-dimensional code reading device. FIG. 4B shows the steel pipe observed immediately after the steel pipe was subjected to the heat treatment process. FIG. 4C shows the positional relationship between illumination means and image pickup means and the steel pipe, as viewed from the direction of the central axis of the steel pipe. FIG. 4D shows the positional relationship between illumination means and image pickup means and the steel pipe, as viewed from the radial outer side of the steel pipe. FIG. 4E shows the steel pipe on which thread cutting was performed by use of thread cutting means and from which the two-dimensional code was removed.

DESCRIPTION OF EMBODIMENTS

Hereinafter, with reference to the accompanying drawings, a description will be given of an embodiment carried out when the present invention was applied to the manufacturing process of oil-well steel pipes.

Figure 3:
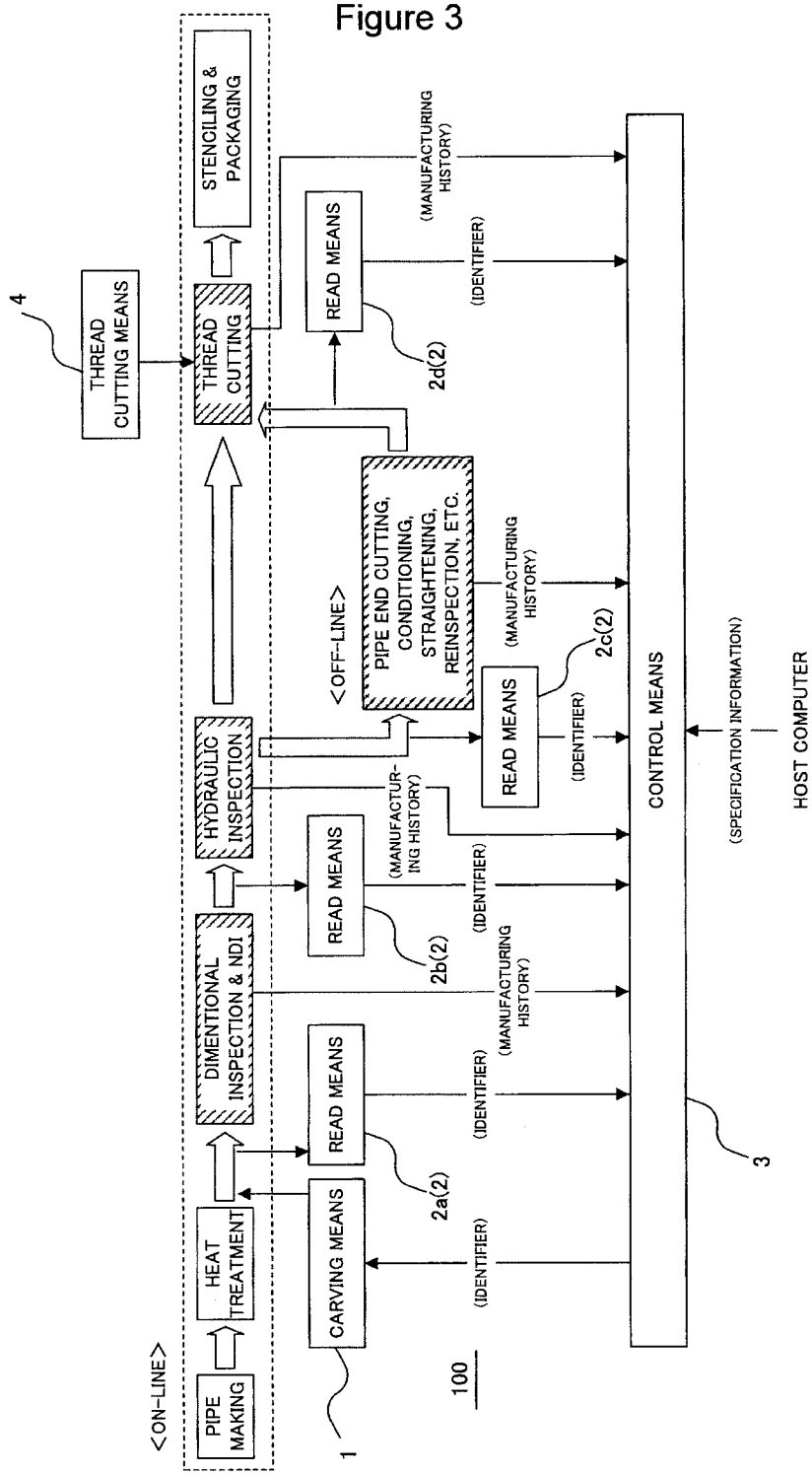
FIG. 3 is a block diagram showing the general functions of a controller which controls the manufacturing history information of oil-well steel pipes.

FIG. 3 is a block diagram showing the general functions of a controller which controls the manufacturing history information of oil-well steel pipes by using the method of controlling member manufacturing history information in an embodiment of the present invention. First, with reference to FIG. 3, a description will be given of the manufacturing process of oil-well steel pipes for which the manufacturing history information is controlled by a controller 100.

As shown in FIG. 3, oil-well steel pipes sequentially undergo a series of manufacturing processes, for example, the pipe making process by the Mannesmann-mandrel mill process, the heat treatment process in a heat treatment furnace, the process in which the inspection of size, shape, appearance and the like and nondestructive inspection (NDI) are carried out (hereinafter, referred to simply as "the inspection process"), and the hydraulic inspection process. For steel pipes whose inspection results are normal, the thread cutting process in which pipe end portions are subjected to thread cutting is performed thereafter and the steel pipes are packaged with stencil indications. These manufacturing processes are carried out in the manufacturing line where the steel pipes are sequentially conveyed (an on-line).

On the other hand, steel pipes whose inspection results in the inspection process and the hydraulic inspection process are bad, are taken out of the on-line, an off-line manufacturing process, such as pipe end cutting, conditioning of the inner and outer pipe surfaces, straightening, and re-inspection (whether or not bends were straightened, and the like), is carried out (hereinafter, referred to simply as "the off-line manufacturing process"), these steel pipes are then returned to the on-line again, and the thread cutting process is carried out in the same manner as described above.

In the controller 100 of this embodiment, the manufacturing history information in the inspection process, the hydraulic inspection process, the off-line manufacturing process and the thread cutting process is control objects among the manufacturing processes of oil-well steel pipes described above. Hereinafter, a description will be given of the method of manufacturing history information control performed by the controller 100 along with the configuration of the controller 100.

The controller 100 is provided with carving means 1, read means 2, control means 3 and thread cutting means 4

The carving means 1 carves a two-dimensional code indicating an identifier for identifying the steel pipe in a region where thread cutting of the steel pipe is to be performed before the first manufacturing process (the inspection process in this embodiment) is performed among manufacturing processes which become control objects of the manufacturing history information. Concretely, according to the steel pipe specification information (including information about customer, delivery time and the like), identification information (hereinafter, referred to as "work number") is sent from a host computer to the control means 3, while the control means 3 gives identification information (hereinafter, referred to as "piece number") to steel pipes with the same work number which are sequentially discharged from a heat treatment furnace in the heat treatment process according to the discharge order of the steel pipes. And these work numbers and piece numbers are sent from the control means 3 to the carving means 1. The carving means 1 carves two-dimensional codes indicating identifiers, which are composed of information corresponding to the sent work numbers and piece numbers, on the steel pipes. The coding algorithm for a two-dimensional code is standardized in JIS, ISO and the like, and the carving means 1 can create a two-dimensional code according to a standardized, publicly-known algorithm. In this embodiment, a data matrix is used as a two-dimensional code.

Figure 1:
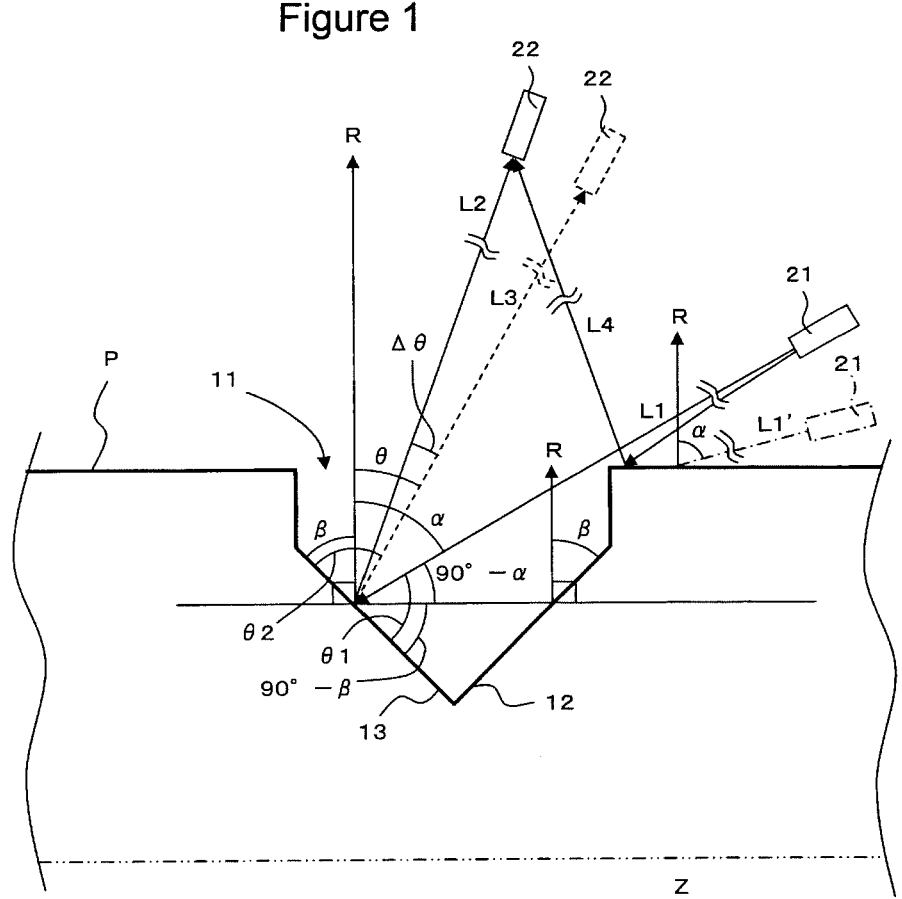
FIG. 1 is a sectional view of a steel pipe including the central axis of the steel pipe and the center of a concave portion.
Figure 2:
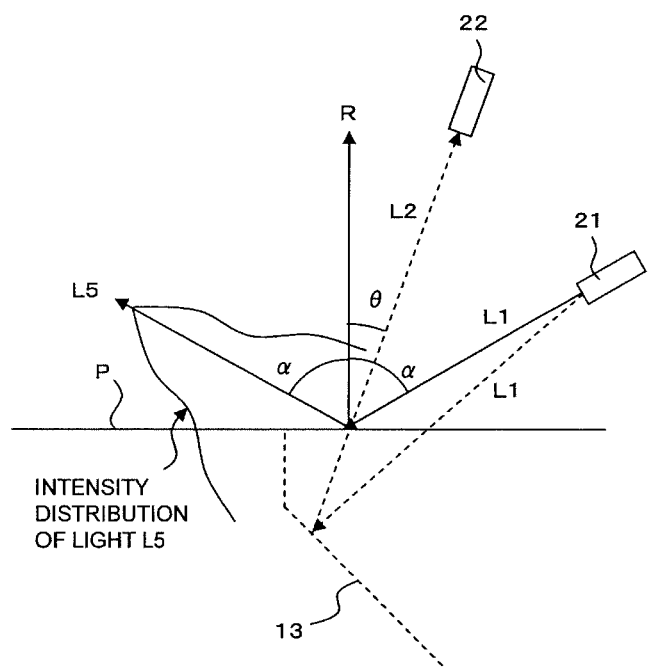
FIG. 2 is a diagram schematically showing that part of the reflected light reflected from the surface of a steel pipe is received by image pickup means.

As described above, a two-dimensional code 10 (see FIG. 4A) carved on an oil-well steel pipe is composed of a plurality of concave portions carved on the surface of each of the steel pipes P which are sequentially discharged from a heat treatment furnace. FIG. 1 is a sectional view of a steel pipe P including the central axis Z of the steel pipe P and the center of a concave portion 11. The concave portion 11 has, in the section shown in FIG. 1, a pair of a first inclined portion 12 and a second inclined portion 13 whose mutual space in the direction of the central axis Z of the steel pipe P becomes narrow toward the radial inner side of the steel pipe P. The first inclined portion 12 is inclined so as to form an angle β in a clockwise direction with respect to a normal-line direction R of a surface of the steel pipe P (a part where the concave portion 11 is not formed) in the section shown in FIG. 1. The second inclined portion 13 is inclined so as to form an angle β in a counterclockwise direction with respect to the normal-line direction R. In the section shown in FIG. 1, the part appearing as the first inclined portion 12 and the second inclined portion 13 in a pair in the concave portion 11 may be composed of, for example, a slope 14 of a circular cone which becomes narrow toward the radial inner side of the steel pipe P (see FIG. 5A), a pair of opposed slopes 15, 16 of a pyramid (see FIG. 5B), or a pair of slopes 17, 18 the mutual space of which becomes narrow toward the radial inner side of the steel pipe P (see FIG. 5C). The center of the concave portion 11 may be, for example, the part which is the middle part of the steel pipe P in the direction of the central axis Z of the steel pipe P in the concave portion 11 and, at the same time, the middle part of the steel pipe P in the circumferential direction.

For example, a mechanical dot imprinting device is advantageously used as the carving means 1 which carves such a two-dimensional code 10. Specifically, when a dot imprinting device is used as the carving means 1, a imprinting member, such as a pin made of a hard material, is pressed against the surface of each of steel pipes P discharged sequentially from a heat treatment furnace (the steel pipe P of the condition shown in FIG. 4B) while being vibrated at high speeds. And the two-dimensional code 10 composed of a plurality of concave portions 11 is carved by changing the position where the imprinting member is pressed according to the two-dimensional code 10 to be formed. As will be described later, it is necessary that the two-dimensional code 10 be removed by performing thread cutting by use of the thread cutting means 4. For this reason, it is necessary only that the front end shape of the making member and the pressing force of the imprinting member be appropriately adjusted so that the depth of the concave portion 11 carved by the pressing of the imprinting member becomes not more than the depth of the thread formed by thread cutting. In the concave portion 11 carved in the pressing position of the imprinting member of the steel pipe P, a change in the microstructure occurs due to stress concentration and an increase in hardness. Therefore, in the oil-well steel pipe P of which corrosion resistance is particularly required, the deterioration of corrosion resistance of this portion is feared and hence it becomes an important factor to remove this portion by the time the final manufacturing process is performed.

The read means 2 reads the two-dimensional code 10 carved on the steel pipe P before each manufacturing process is performed or while each manufacturing process is being performed. In this embodiment, as the read means 2 there are arranged read means 2a, which reads the two-dimensional code 10 immediately before the inspection process, read means 2b, which reads the two-dimensional code 10 immediately before the hydraulic inspection process, read means 2c, which reads the two-dimensional code 10 immediately before the off-line manufacturing process, and read means 2d, which reads the two-dimensional code 10 immediately before the thread cutting process.

Figure 4A:
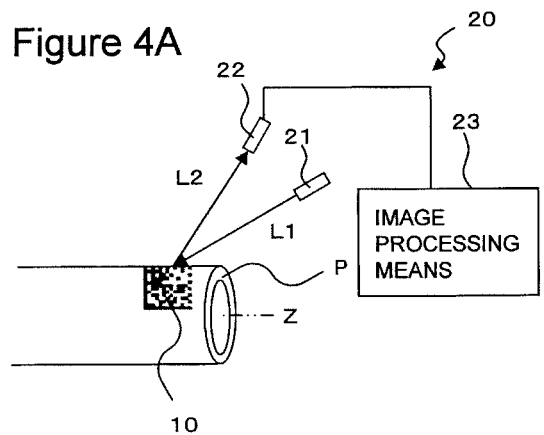
FIGS. 4A to 4E are diagrams schematically showing a steel pipe and a two-dimensional code reading device.
Figure 4B:
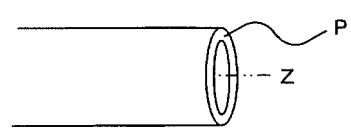
Figure 5A:
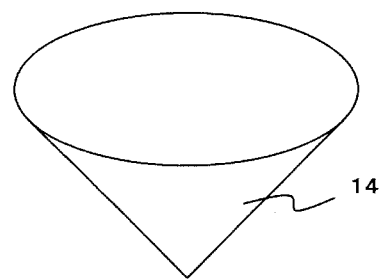
FIGS. 5A to 5C show concrete examples of a portion which appears as a pair of inclined portions in the section shown in FIG. 1.
Figure 5B:
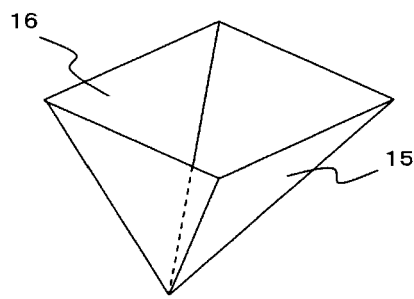
Figure 5C:
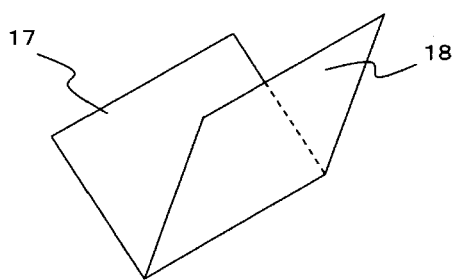

The two-dimensional code reading device 20 shown in FIG. 4A is used in each of the read means 2a to 2d. The two-dimensional code reading device 20 picks up an image of a steel pipe P while rotating the steel pipe P around the central axis Z of the steel pipe P, and reads the two-dimensional code 10 carved on the steel pipe P. As shown in FIG. 4A, the two-dimensional code reading device 20 is provided with illumination means 21 which irradiates the two-dimensional code 10 with light L1, image pickup means 22 which picks up an image of the two-dimensional code 10, and image processing means 23.

Figure 4C:
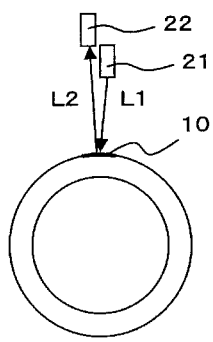

In reading the two-dimensional code 10 carved on the steel pipe P, the illumination means 21 and the image pickup means 22 are arranged on the radial outer side of the steel pipe P (see FIG. 4C) with respect to the two-dimensional code 10.

Figure 4D:
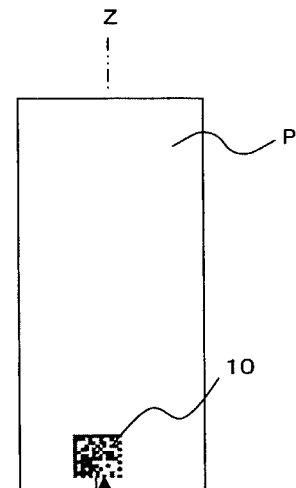

In reading the two-dimensional code 10, the image pickup means 22 is arranged so as to be positioned along the direction of the central axis Z of the steel pipe P as viewed from the radial outer side of the steel pipe P (see FIG. 4D). And in the section shown in FIG. 1, the image pickup means 22 receives light L2, which is reflected from the second inclined portion 13 in a direction forming an angle $\theta$ with the normal-line direction R. In the section shown in FIG. 1, the angle $\theta$ is an angle in a turn direction reverse to a turn direction at which the second inclined portion 13, which reflects the light L2 being received by the image pickup means 22, forms an angle $\beta$ with respect to the normal-line direction R.

Concretely, because the second inclined portion 13 forms the angle $\beta$ with respect to the normal-line direction R in a counterclockwise direction, the angle $\theta$ is an angle in a clockwise direction. This angle $\theta$ has values in the range indicated in expression (1).

$$30° \leq \theta \leq 35° \tag{1}$$

On the other hand, in reading the two-dimensional code 10, the illumination means 21 is arranged so as to be positioned along the central axis Z of the steel pipe P as viewed from the radial outer side of the steel pipe P (see FIG. 4D). And in the section shown in FIG. 1, the illumination means 21 irradiates the second inclined portion 13, which reflects the light L2, with the light L1 from a direction forming an angle $\alpha$ with the normal-line direction R, the reflected light L2 being received by the image pickup means 22. As with the angle $\theta$, the angle $\alpha$ is an angle in a turn direction reverse to a turn direction at which the second inclined portion 13 irradiated with the light L1 by the illumination means 21 forms the angle $\beta$ with respect to the normal-line direction R, i.e., an angle in a clockwise direction.

The angles $\alpha$, $\theta$ and $\beta$ have values satisfying expression (2):

$$\Delta\theta = \theta - 180° + \alpha + 2\beta \tag{2}$$

Because the angles $\alpha$, $\theta$ and $\beta$ have values satisfying expression (2), the image pickup means 22 is arranged in a position where the image pickup means 22 easily receives the specularly reflected light L3, which is reflected specularly from the second inclined portion 13 after being irradiated by the illumination means 21 to the second inclined portion 13. As shown in FIG. 1, if the image pickup means 22 is arranged in a position where the image pickup means 22 most easily receives the specularly reflected light L3 (see the broken line in FIG. 1), then the angle $\theta1$ formed by the direction in which the illumination means 21 irradiates the second inclined portion 13 and the second inclined portion 13 and the angle $\theta2$ formed by the reflection direction of the specularly reflected light L3 and the second inclined portion 13, are the same. The angle $\theta1$ is $\{(90°-\alpha)+(90°-\beta)\}$, and the angle $\theta2$ is $(\beta+\theta)$. Therefore, if the image pickup means 22 is arranged in a position where the image pickup means 22 most easily receives the specularly reflected light L3, then the difference $\Delta\theta$ between the angle $\theta1$ and the angle $\theta2$ ($\Delta\theta=\theta2-\theta1=\theta-180°+\alpha+2\beta$) becomes 0. In this embodiment, it is required that the difference $\Delta\theta$ be not less than $-10°$ but not more than $10°$, and hence the image pickup means 22 is arranged in a position where the image pickup means 22 easily receives the specularly reflected light L3. Because the image pickup means 22 is arranged in a position where the image pickup means 22 easily receives the specularly reflected light L3 like this, the image pickup means 22 can pick up a very bright image of the concave portion 11. On the other hand, because it is required that the angle $\theta$ be not less than 30°, the light L4 reflected from the surface of the steel pipe P (the part where the concave portion 11 is not carved) is not easily received by the image pickup means 22. Therefore, the image pickup means 22 can pick up a very dark image of the surface of the steel pipe P. For this reason, in an image of the steel pipe P picked up by the image pickup means 22, the contrast between the concave portion 11 and the surface of the steel pipe P is high.

Because it is required that the angle θ be not less than 30°, it is unnecessary to increase the angle α in order to ensure that the light L4 reflected from the surface of the steel pipe P is not easily received by the image pickup means 22. Therefore, the phenomenon that the region of which a bright image can be picked up decreases in the concave portion 11, which is caused by an increase in the angle α, does not occur, and it is possible to prevent a region corresponding to the concave portion 11 (a region of high luminance) in an image of the steel pipe P picked up by the image pickup means 22 from becoming small.

Because it is required that the angle θ be not more than 35°, in an image of the steel pipe P picked up by the image pickup means 22, the distortion of the two-dimensional code 10 is prevented from increasing. Furthermore, as shown in FIG. 4D, in this embodiment, the two-dimensional code 10 is irradiated with the light L1 from a direction along the direction of the central axis Z of the steel pipe P and an image of the two-dimensional code 10 is picked up from a direction along the direction of the central axis Z of the steel pipe P. That is, in this embodiment, the irradiation direction and the image pickup direction are directions along the central axis Z of the steel pipe P. For this reason, in an image of the steel pipe P picked up by the image pickup means 22, the phenomenon that the two-dimensional code 10 becomes distorted by the curvature of the steel pipe P is also suppressed.

The image pickup means 22 sends a picked-up image of the image-captured steel pipe P to the image processing means 23. The image processing means 23 is means which reads the two-dimensional code 10 whose image is picked up by the image pickup means 22, and converts the read two-dimensional code 10 into an identifier. Concretely, upon receipt of the picked-up image from the image pickup means 22, the image processing means 23 performs the pattern matching of the two-dimensional code 10 for the picked-up image, and makes a judgment as to whether or not there is a region corresponding to the two-dimensional code 10 in the picked-up image. The pattern used in this pattern matching is a pattern in which picture elements of high luminance (picture elements corresponding to the concave portion 11) are arrayed in the shape of a rectangle having the same shape as the profile of the two-dimensional code 10. As described above, in the picked-up image, because of the high contrast between the concave portion 11 and the surface of the steel pipe P, it is easy to distinguish between the picture elements corresponding to the concave portion 11 and the picture elements corresponding to the surface of the steel pipe P. Therefore, it is possible to perform pattern matching as described above with good accuracy.

When the image processing means 23 judges by pattern matching that there is a region corresponding to the two-dimensional code 10 in the picked-up image, the image processing means 23 subjects the region corresponding to the two-dimensional code 10 to dilation. This dilation is performed only for the picture elements of not less than a prescribed luminance. That is, this dilation is performed only for the region corresponding to the concave portion 11 in the region corresponding to the two-dimensional code 10. By subjecting the region corresponding to the concave portion 11 to dilation like this, it is possible to increase the area on the picked-up image even when the concave portion 11 has a small area of the region irradiated by the illumination means 21. Examples of the case where the area of the region irradiated by the illumination means 21 decreases include the case where the light L1 from the illumination means 21 is cut off by scale and the like adhering to the steel pipe P and part of the light L1 does not reach the second inclined portion 13. By performing dilation like this, it is possible to prevent, for example, a region of high luminance corresponding to the concave portion 11 from being recognized as noise without being recognized as the concave portion 11 in recognition software of two-dimensional codes, which will be described next.

After dilation, the image processing means 23 reads the two-dimensional code 10 from the picked-up image by using publicly-known two-dimensional-code 10 recognition software (for example, IDMax made by Cognex K. K.). As described above, because in a picked-up image the contrast between the concave portion 11 and the surface of the steel pipe P is high and the occurrence of the phenomenon that the two-dimensional code 10 becomes distorted is suppressed, it is possible to read the two-dimensional code 10 stably and with good accuracy by using two-dimensional-code 10 recognition software. The image processing means 23 decodes the read two-dimensional code 10, converts the two-dimensional code 10 into an identifier, and sends the identifier to the control means 3.

When the image processing means 23 cannot detect a region corresponding to the two-dimensional code 10 by performing the above-described pattern matching, the image processing means 23 gives instructions to the image pickup means 22 to pick up an image of the two-dimensional code 10 again. When the image processing means 23 cannot detect a region corresponding to the two-dimensional code 10 even by performing pattern matching for a prescribed number of picked-up images, the image processing means 23 finishes the pattern matching of the two-dimensional code 10 at that point in time, and informs the worker of the finish of the pattern matching by causing the finish to be indicated on a monitor and the like.

A steel pipe P for which the two-dimensional code 10 has been read in each read means 2 (in this embodiment, the two-dimensional code reading device 20) is caused to undergo each of the manufacturing processes, and the manufacturing history information of the steel pipe P obtained in each of the manufacturing processes is manually or automatically inputted to the control means 3. Concretely, a steel pipe P for which the two-dimensional code 10 has been read in the read means 2a is caused to undergo the inspection process, and the inspection results (results of the inspection of size, shape, appearance and the like and nondestructive inspection) are inputted to the control means 3 as manufacturing history information. A steel pipe P for which the two-dimensional code 10 has been read in the read means 2b is caused to undergo the hydraulic inspection process, and the hydraulic inspection results are inputted to the control means 3 as manufacturing history information. A steel pipe P for which the two-dimensional code 10 has been read in the read means 2c is caused to undergo the off-line manufacturing process, and the results (information about pipe end cutting, conditioning of the inner and outer surfaces of the pipe, straightening, re-inspection and the like) are inputted to the control means 3 as manufacturing history information. A steel pipe P for which the two-dimensional code 10 has been read in the read means 2d is caused to undergo the thread cutting process, and the results of the thread cutting are inputted to the control means 3 as manufacturing history information.

The control means 3 stores the manufacturing history information of a steel pipe P obtained and inputted in each of the manufacturing processes and the identifier of the steel pipe P sent by each of the read means 2 by tying the manufacturing history information and the identifier to each other. In other words, if an identifier of a steel pipe P is inputted to the control means 3, it is possible to extract the manufacturing history information in each of the manufacturing processes of the steel pipe P stored by being tied to the identifier, and this enables the manufacturing history information of each steel pipe P to be appropriately controlled. In this embodiment, the configuration is such that a process computer for controlling each of the production equipment provided in the manufacturing line of steel pipes P functions as the control means 3.

Figure 4E:
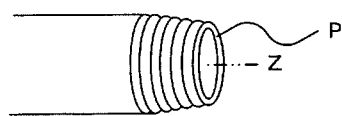

The thread cutting means 4 removes the two-dimensional code carved on a steel pipe P by performing the thread cutting of an end portion of the steel pipe P in the last manufacturing process among the manufacturing processes which become control objects of the manufacturing history information in this embodiment (see FIG. 4E). It is possible to use, for example, a chaser in which a plurality of cutting portions in the shape of thread are linearly arranged as the thread cutting means 4. After the arrangement direction of the cutting portions of the chaser is positioned parallel to the axial direction of the steel pipe P, the cutting portions are axially fed while the steel pipe P is being rotated, whereby the end portion of the steel pipe P is sequentially cut by each of the cutting portions.

Because the thread cutting process and the stenciling and packaging process following the thread cutting process are continuous on-line processes, there is no possibility that in the two processes the conveyance order of the steel pipe P changes, and the two processes are controlled by a process computer 3. Therefore, even in the case where a two-dimensional code 10 carved on the steel pipe P is removed by performing the thread cutting process as described above, because the identifier indicated by the two-dimensional code 10 is stored in the process computer 3 by being tied to the conveyance order of the steel pipe P in the thread cutting process, it is possible to tie the above-described stored identifier to each steel pipe P according to the conveyance order of the steel pipe P also in the stenciling and packaging process. In other words, even when the two-dimensional code 10 is removed in the thread cutting process, it is possible to maintain the tying of each steel pipe P shipped after the stenciling and packaging process as a product to the identifier and manufacturing history information about each of the steel pipes P.

As described above, the two-dimensional code reading device 20 used as the read means 2 in this embodiment can read the two-dimensional code 10 carved on the steel pipe P stably and with good accuracy. For this reason, if the two-dimensional code reading device 20 is used, it is possible to control manufacturing history information appropriately and efficiently by using the two-dimensional code 10 carved on the steel pipe P by means of imprinting and the like.

According to the manufacturing history information control method of members in this embodiment, a two-dimensional code 10 is carved in a region where thread cutting of the steel pipe P is to be performed before the first manufacturing process is performed among manufacturing processes which become control objects of the manufacturing history information, and in the process which involves performing thread cutting in an end portion of the steel pipe P, the two-dimensional code 10 carved in the steel pipe P is removed. Therefore, in each of the manufacturing processes which become control objects of manufacturing history information, in performing reading by use of the two-dimensional code reading device 20, the two-dimensional code 10 is carved in the steel pipe P and it is possible to store the obtained manufacturing history information of a steel pipe P and an identifier indicating the two-dimensional code 10 read about the steel pipe P by tying the manufacturing history information and the two-dimensional code 10 to each other. In other words, for steel pipes P which have underwent not only the on-line manufacturing processes, but also the off-line manufacturing process, it is possible to control the manufacturing history information for each steel pipe P by use of an identifier. On the other hand, in the process which involves performing thread cutting in an end portion of the steel pipe P, the two-dimensional code 10 is removed, and hence the two-dimensional code 10 does not remain in the steel pipe P as a product. Therefore, no problem occurs at all even when a steel pipe P whose manufacturing history information is controlled by the member manufacturing history information control method of this embodiment is an oil-well steel pipe and the like, for which required specifications concerning corrosion resistance and the like have become severe. If after the removal of the two-dimensional code 10 carved by thread cutting, corresponding two-dimensional codes 10 are indicated by a stencil in the stenciling and packaging process, which is an on-line process and is collectively controlled by the process computer 3, then this is advantageous when the manufacturing history information of each steel pipe P is referred to later. That is, by reading a two-dimensional code 10 indicated by a stencil and inputting an identifier indicated by the two-dimensional code 10 to the control means 3, it is possible to easily extract the manufacturing history information about the steel pipe P stored by being tied to the identifier in each of the manufacturing processes.

EMBODIMENTS

TABLE 1

|  | Angle θ | Angle α | Difference Δθ | Read results |
|---|---|---|---|---|
| Comparative Example 1 | 25 | 70 | 5 | Bad |
| Comparative Example 2 | 25 | 65 | 0 | Bad |
| Comparative Example 3 | 30 | 75 | 15 | Bad |
| Example 1 | 30 | 70 | 10 | Good |
| Example 2 | 30 | 65 | 5 | Good |
| Example 3 | 30 | 60 | 0 | Good |
| Example 4 | 30 | 55 | −5 | Good |
| Example 5 | 30 | 50 | −10 | Good |
| Comparative Example 4 | 30 | 45 | −15 | Bad |
| Comparative Example 5 | 35 | 70 | 15 | Bad |
| Example 6 | 35 | 65 | 10 | Good |
| Example 7 | 35 | 60 | 5 | Good |
| Example 8 | 35 | 55 | 0 | Good |
| Example 9 | 35 | 50 | −5 | Good |
| Example 10 | 35 | 45 | −10 | Good |
| Comparative Example 6 | 35 | 40 | −15 | Bad |
| Comparative Example 7 | 40 | 50 | 0 | Bad |

Table 1 shows the angle θ, angle α and difference Δθ in each of Embodiments 1 to 10 and each of Comparative Examples 1 to 7, and the read results as to whether or not the image processing means 23 was capable of reading the two-dimensional code 10 correctly. The angle β was 45° in Embodiments 1 to 10 and Comparative Examples 1 to 7.

Figure 6:
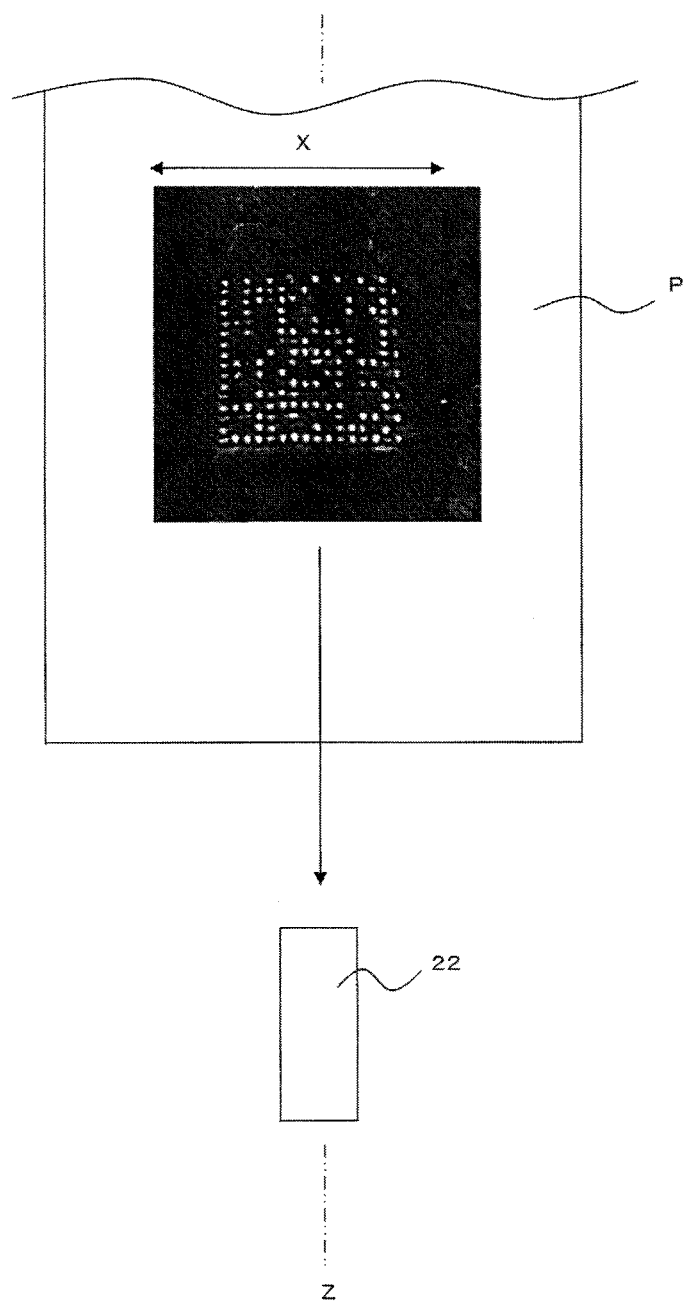
FIG. 6 shows an image of a steel pipe picked up in Embodiment 3.

FIG. 6 shows an image of a steel pipe P picked up by the image pickup means 22 in Embodiment 3. As shown in FIG. 6, the white parts of the picked-up image indicate concave portions 11 and the black parts indicate the surface of the steel pipe P where no concave portion 11 is formed. As shown in Table 1, in Embodiment 3, the two-dimensional code 10 was capable of being read correctly. This is because as shown in FIG. 6, the contrast between the concave portions 11 and the surface of the steel pipe P where no concave portion 11 is formed is high in the picked-up image, because the area of each of the concave portions 11 is large enough to be recognized as concave portions 11 by the image processing means 23, and because the distortion of the two-dimensional code 10 is small.

On the other hand, in Comparative Example 2, the two-dimensional code 10 was not read correctly. The reason for this can be considered as follows. In Comparative Example 2, because the angle θ is less than 30°, the light reflected from the surface of the steel pipe P where no concave portion 11 is formed is easily received by the image pickup means 22. For this reason, in the picked-up image, the luminance of the surface of the steel pipe P where no concave portion 11 is formed becomes high. When the luminance of the surface of the steel pipe P where no concave portion 11 is formed becomes high, the contrast between the concave portion 11 and the surface of the steel pipe P where no concave portion 11 is formed becomes low. It seems that the two-dimensional code 10 was not read correctly because of the low contrast like this. In Comparative Example 1, in order to ensure that even when the angle θ is less than 30°, the light reflected from the surface of the steel pipe P where no concave portion 11 is formed is not easily received by the image pickup means 22, the angle α was set at a value larger than in Comparative Example 2. However, also in Comparative Example 1, the two-dimensional code 10 was not read correctly. The reason for this can be considered as follows. By increasing the angle α, the light from the illumination means 21 does not easily enter the inner side of the concave portion 11. For this reason, in the pair of inclined portions 12, 13, the area of the region irradiated by the illumination means 21 becomes small and the region of the concave portion 11 of which a bright image can be picked up becomes small. When the region of which a bright image can be picked up is small, the two-dimensional code recognition software does not easily recognize the bright region as a region corresponding to the concave portion 11. It seems that because of this, the two-dimensional code 10 was not read correctly. In Comparative Example 7, the two-dimensional code 10 was not read correctly. It seems that, with the angle θ exceeding 35°, this is because in the picked-up image of the steel pipe P, the size in a direction orthogonal to the direction of the central axis Z of the steel pipe P (the direction of arrow X in FIG. 6) differs greatly on the side of the two-dimensional code 10 near the image pickup means 22 and the side thereof distant from the image pickup means 22, with the result that the two-dimensional code 10 becomes distorted greatly. In Comparative Examples 3 to 6, the two-dimensional code 10 was not read correctly. In all of Comparative Examples 3 to 6, the absolute value of the difference Δθ exceed 10° and the specularly reflected light from the concave portion 11 is not easily received by the image pickup means 22. For this reason, in the picked-up image, the luminance of the concave portion 11 becomes low and the contrast between the concave portion 11 and the surface of the steel pipe P where no concave portion 11 is formed becomes low. It seems that the two-dimensional code 10 was not read correctly because of the low contrast like this.

REFERENCE SIGNS LIST

100 . . . Controller, 20 . . . Two-dimensional code reading device, 21 . . . Illumination means, 22 . . . Image pickup means, 23 . . . Image processing means

The invention claimed is:

1. A two-dimensional code reading device which reads a two-dimensional code composed of a plurality of concave portions carved in a member having a substantially circular section orthogonal to a central axis thereof, comprising:
  a light source which irradiates the two-dimensional code with light from a direction along the central axis of the member; and
  an image pickup device which picks up an image of the two-dimensional code from a direction along the central axis,
  wherein the concave portion has a pair of a first inclined portion and a second inclined portion of which a mutual space in the direction of the central axis becomes narrow toward a radial inner side of the member in a section including the central axis and the center of the concave portion,
  wherein the first inclined portion is inclined so as to form an angle β in a clockwise direction with respect to a normal-line direction of a surface of the member in the section,
  wherein the second inclined portion is inclined so as to form an angle β in a counterclockwise direction with respect to the normal-line direction,
  wherein the image pickup device is arranged so as to receive light reflected in a direction forming an angle θ satisfying expression (1) below with respect to the normal-line direction in the section in either of the first inclined portion and the second inclined portion, and
  wherein the the light source is arranged so as to irradiate either of the inclined portions from a direction forming an angle α satisfying expression (2) below with respect to the normal-line direction in the section:

$$30° \le \theta \le 35° \quad (1)$$

$$\Delta\theta = \theta - 180° + \alpha + 2\beta \quad (2)$$

where β is less than 90°,
  Δθ is not less than −10° but not more than 10°, and
  θ and α are angles in a turn direction reverse to a turn direction at which either of the inclined portions forms the angle β with respect to the normal-line direction.

2. A two-dimensional code reading method for reading a two-dimensional code composed of a plurality of concave portions carved in a member having a substantially circular section orthogonal to a central axis thereof, comprising the steps of:
  irradiating the two-dimensional code with light from a direction along the central axis of the member; and
  picking up an image of the two-dimensional code from a direction along the direction of the central axis,
  wherein the concave portion has a pair of a first inclined portion and a second inclined portion of which a mutual space in the direction of the central axis becomes narrow toward a radial inner side of the member in a section including the central axis and the center of the concave portion,
  wherein the first inclined portion is inclined so as to form an angle β in a clockwise direction with respect to a normal-line direction of a surface of the member in the section,
  wherein the second inclined portion is inclined so as to form an angle β in a counterclockwise direction with respect to the normal-line direction,
  wherein in the step of picking up the image of the two-dimensional code, light reflected in a direction forming an angle θ satisfying expression (3) below with respect to the normal-line direction in the section is received in either of the first inclined portion and the second inclined portion, and wherein in the step of irradiating the two-dimensional code with light, either of the inclined portions is irradiated from a direction forming an angle α satisfying expression (4) below with respect to the normal-line direction in the section:

$$30° \leq \theta \leq 35° \quad (3)$$

$$\Delta\theta = \theta - 180° + \alpha + 2\beta \quad (4)$$

where β is less than 90°,
Δθ is not less than −10° but not more than 10°, and
θ and α are angles in a turn direction reverse to a turn direction at which either of the inclined portions forms the angle β with respect to the normal-line direction.

\* \* \* \* \*

UNITED STATES PATENT AND TRADEMARK OFFICE
CERTIFICATE OF CORRECTION

PATENT NO.       : 8,651,382 B2
APPLICATION NO.  : 12/996637
DATED            : February 18, 2014
INVENTOR(S)      : Tanida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 434 days.

Signed and Sealed this

Twenty-ninth Day of September, 2015

Michelle K. Lee
*Director of the United States Patent and Trademark Office*